/ Patented July 10, 1951

2,559,670

UNITED STATES PATENT OFFICE 2,559,670

AZO COMPOUNDS OF THE THIOPHANTHRAQUINONE SERIES

Herman E. Schroeder and Lorraine A. Ringrose, Wilmington, Del., assignors to E. I. du Pont de Nemours & Company, Wilmington, Del., a corporation of Delaware No Drawing. Application June 17, 1949, Serial No. 99,874

7 Claims. (Cl. 260—152)

This invention relates to the preparation of new dye intermediates of the thiophanthraquinone series, and more particularly to new azobiphenylcarbonylaminothiophanthraquinone compounds.

While a number of vat dyes in the yellow range have been used in the dyeing and printing of textiles, the fastness properties of these yellow colors are poor as compared with the fastness properties of many of the other colors in the vat dye class. Where yellow dyes in this class with improved fastness properties have been found, they in turn are either dull or weak tinctorially and therefore the various yellow dyes in the vat dye class are chosen to answer a particular need, balancing the question of fastness, brightness and cost of the particular dye available.

It is an object of this invention to produce new and valuable dye intermediates particularly useful as acylating agents in the manufacture of yellow vat dyes of desirable shades. It is a further object of the invention to produce new azobiphenylcarbonylaminothiophanthraquinone compounds which on further condensation or ring closure yield valuable yellow vat dyes which exhibit exceptionally good tinctorial strength and light fastness properties and which are valuable for the printing as well as the dyeing of textile fibers.

The compounds of this invention are 4,4'-azobiphenyl - 4'' - carbonylaminothiophanthraquinone-4'''-carboxylic acids and their functional derivatives which may be represented by the general formula:

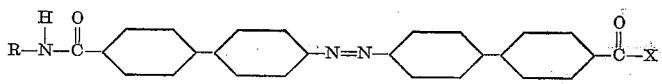

in which R stands for a thiophanthraquinone radical which may be unsubstituted or it may contain simple monovalent substituents such as halogen, methoxy, benzoylamino and thenoylamino groups, which thiophanthraquinone radical is attached to the imino group through its benzene nucleus, and X stands for a member of the group consisting of —OH, —NH₂, —Cl and —O-alkyl in which the alkyl radical contains from 1 to 18 carbon atoms. These compounds which contain the free carboxylic acid radical or functional derivative thereof may, on further condensation either directly or after a simple hydrolysis step, be converted to a wide range of new and valuable vat dyes.

The compounds of the above given formula may be prepared in good yields and in an excellent state of purity by the condensation of one mol of an aminothiophanthraquinone compound with one mol of 4,4'-azobiphenyl-4'',4'''-dicarbonyl chloride. The reaction is preferably carried out in an inert solvent under anhydrous conditions at temperatures of from 140° to 200° C. The condensation appears to take place substantially quantitatively on one end of the dicarbonylchloride only, for, by its analysis and its further condensation with amines, the product appears to be uniform in its composition and to be a substantially pure compound.

The following examples are given to illustrate the invention. The parts used are by weight.

Example 1

A mixture of 420 parts of dry nitrobenzene and 28 parts of azobiphenyldicarbonyl chloride was heated to 130° C., and then 14.7 parts of 5-aminothiophanthraquinone were added. The charge was heated at 150° C. for one hour, cooled to 100° C., filtered and the bright yellow filter cake was washed with nitrobenzene, benzene and petroleum ether, in turn, and dried.

An analysis of the product substantiates the formula:

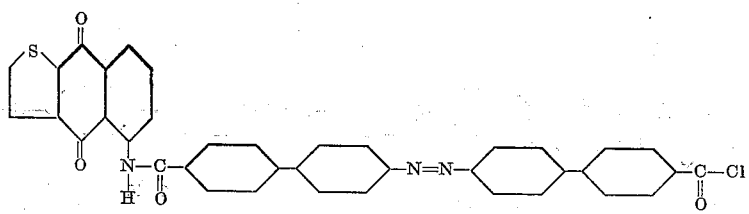

It is obtained in practically quantitative yield. The yield and product obtainable on further reaction with amines indicates that there is no appreciable amount of diamide formed in the first reaction.

Example 2

A mixture of 80 parts of dry nitrobenzene and 5 parts of azobiphenyldicarbonyl chloride was treated with 3 parts of 2-chloro-5-aminothiophanthraquinone according to the procedure given in Example 1. The bright yellow product which was isolated in excellent yield is represented by the formula:

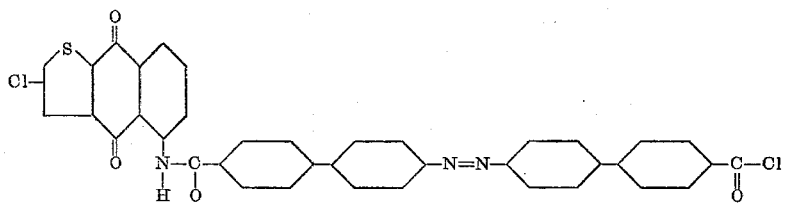

Example 3

At 130° C., 2.4 parts of 6-aminothiophanthraquinone were added to a mixture of 60 parts of dry ortho-dichlorobenzene and 4 parts of azobiphenyldicarbonyl chloride. The charge was heated at 150° C. for one hour, and the product was isolated by the method given previously in Example 1. The greenish-yellow crystalline product, obtained in excellent yield, is represented by the formula:

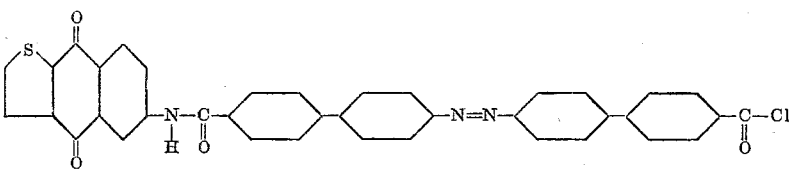

Example 4

A mixture of 60 parts of dry ortho-dichlorobenzene, 4 parts of azobiphenyldicarbonyl chloride and 2.4 parts of 5-chloro-6-aminothiophanthraquinone was treated according to the procedure given in Example 1. The greenish-yellow crystalline compound obtained is represented by the formula:

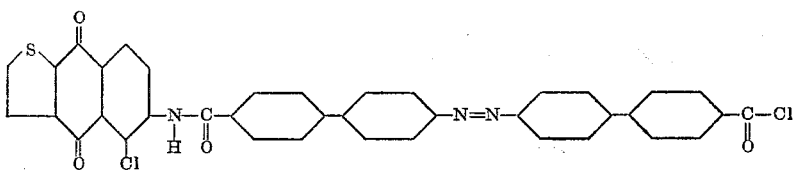

Example 5

A mixture of 4.45 parts of azobiphenyldicarbonyl chloride in 75 parts of dry nitrobenzene was treated with 3.2 parts of 6-amino-7-bromothiophanthraquinone according to the method in Example 1. The greenish-yellow product has the formula:

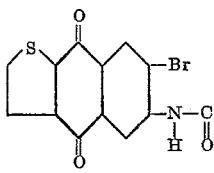
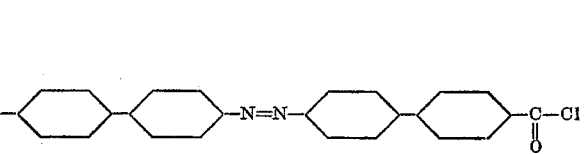

Example 6

A mixture of 90 parts of dry nitrobenzene and 6 parts of azobiphenyldicarbonyl chloride was treated with 3.1 parts of 8-aminothiophanthraquinone according to the procedure given in Example 1. The bright yellow crystalline product obtained in excellent yield is represented by the formula:

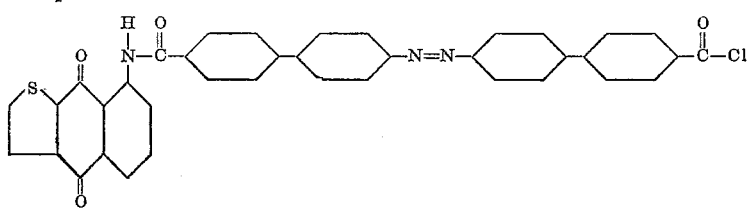

Any of the acid chloride compounds of this invention which may be produced as illustrated in the above examples may be converted to the acid amide by treating the reaction mass in which it is formed, and without isolation, with ammonia at temperatures of around 125° C. for 3 to 4 hours. The resulting acid amides may be recovered by filtering and washing with benzene, alcohol and hot water, in turn, or in the same manner as illustrated in the above examples for the acid chloride compounds.

Example 7

Ten (10) parts of the condensation product of 1 mol of 6-amino-5-chlorothiophanthraquinone and 1 mol of azobiphenyldicarbonyl chloride, as prepared in the above examples, were added to 200 parts of nitrobenzene and the whole was heated to 130° C. At this temperature ammonia gas was bubbled through the mass for 4 hours. The amide so formed was filtered off, washed free from nitrobenzene with alcohol, and then with hot water. It dyes cotton in weak yellow shades from a brownish alkaline hydrosulfite vat. It has the formula:

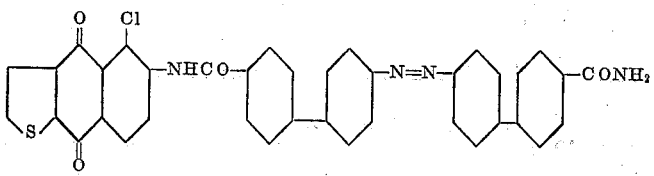

The acid chloride compounds of this invention may also be readily converted to compounds containing the free carboxylic acid group by dissolving the acid chloride compound in concentrated sulfuric acid at from 5° to 10° C. This effects hydrolysis of the acid chloride group with liberation of hydrochloric acid. Alternatively, the free acid compounds may be prepared as follows:

*Example 8*

To the nitrobenzene wet cake, containing 50 parts of the condensation product of 1 mol of 6-amino-5-chlorothiophanthraquinone with 1 mol of azobiphenylcarbonyl chloride (as obtained in any of the above examples), 200 parts of nitrobenzene were added. After heating to 130° C., 25 parts of water were added under reflux condenser and heating was continued at 110°–130° C. for four hours. A sample of the reaction mass was removed. It was filtered, washed with nitrobenzene and alcohol and dried. It was difficult to vat but dyed cotton from a brownish vat in weak yellow shades. It has the formula:

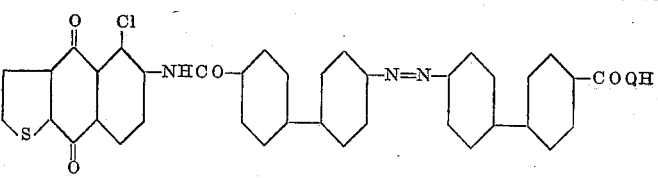

The mono acid chloride compounds of the present invention may be converted to esters by reacting with alcohols of from 1 to 18 carbon atoms, preferably in an organic solvent at temperatures of from 125° to 135° C., as illustrated in the follownig example:

*Example 9*

Ten (10) parts of the condensation product of 1 mol of 6-amino-5-chlorothiophanthraquinone with 1 mol of azobiphenyldicarbonyl chloride were suspended in 200 parts of nitrobenzene and the whole heated to 130° C. in a vessel fitted with reflux condenser. Nine (9) parts of methyl alcohol were gradually added at this temperature, and a temperature of 110°–130° C. was maintained for six hours. The product was filtered off after cooling, washed with nitrobenzene and alcohol, finally steamed, and dried. It was a light yellow compound which dyed cotton in weak yellow shades from a brownish alkaline hydrosulfite vat. It has the formula:

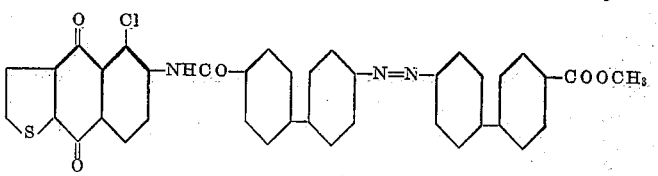

In the above example, other aliphatic alcohols of the series containing from 1 to 18 carbon atoms may be substituted for the methyl alcohol, such as ethyl, isopropyl, butyl, isobutyl, octyl, cetyl, dodecyl and octadecyl alcohol, etc. These alcohols may be primary or secondary alcohols. These esters may also be hydrolyzed to the free acid by the usual hydrolysis method.

The acid chlorides, free acids, amides and esters are vattable and, where they contain halogen in a position ortho to the thiophanthraquinone imino group, they may be converted by ring closure to the oxazole ring into valuable dyes, as more particularly disclosed in our copending application Serial No. 99,875 filed of even date herewith.

Other aminothiophanthraquinones than those specifically used in the examples to illustrate the invention may of course be employed, such as the 5,7-dibromo - 6 - aminothiophanthraquinone, 7-aminothiophanthraquinone, 5-amino-8-methoxy-thiophanthraquinone, 8-amino-5-benzoylamino-thiophanthraquinone, 8-amino-5-thenoylamino-thiophanthraquinone. These may be substituted in the specific examples to give dye intermediates coming within the scope of the present invention.

In place of pure aminothiophanthraquinones, the normally occurring mixtures of the 5- and 8-(alpha) or the 6- and 7-(beta)-amines may be employed. Similarly, a mixture of 5-chloro-6-aminothiophanthraquinone with 8-chloro-7-aminothiophanthraquinone and other similar mixtures may be used to give valuable dye intermediates of this series. Of the halogenated amines, those possessing halogen in a position ortho to the amino group are particularly valuable for further condensations and ring formations.

The condensation employed in the production of the compounds of this invention may be carried out under a wide variety of conditions as to temperature and time, depending upon the reactants to be used. A temperature range of 140°–200° C. usually gives most satisfactory results, although temperatures outside of this range are occasionally necessary. The condensations are carried out in inert organic solvents such as the aromatic hydrocarbons, and chlorinated and nitrated aromatic hydrocarbons; catalysts such as pyridine may be used. It is usually preferable to add the amine to the acid chloride at reaction temperature or to heat up an equimolar mixture of the two. The acid chloride itself may be used, or if it appears preferable it may be prepared in situ, e. g. by treating the acid with thionyl chloride in solvent, removing the excess of thionyl chloride by air blowing, and proceeding with the condensation as described in the above examples. The acid chlorides thus obtained are surprisingly stable crystalline compounds which may be isolated in high yield.

Compounds of the present invention are new products which on further condensation give novel and particularly valuable vat dyestuffs of very good light fastness and good printing properties. They are of particular utility for the preparation of unsymmetrical vat dyestuffs of outstanding properties, as more particularly described in our co-pending applications Serial Nos. 99,876, 99,877, and 99,878.

The 4,4'-azobiphenyldicarboxylic acid employed in the above examples is readily prepared by the sodium hydroxide-glucose reduction of 4,4'-nitrophenyl benzoic acid. The dicarboxylic acid is converted to the acid chloride by treating the free acid or its sodum salt with thionyl chloride, or phosphorus pentachloride in an inert solvent such as aromatic hydrocarbons or the chlorinated or nitrated aromatic hydrocarbons. The azobiphenyldicarbonyl chloride employed in the above examples is the 4,4'-azobiphenyl-4'',4'''-dicarbonyl chloride which has a melting point of 260°–262° C.

The aminothiophanthraquinones employed as the starting materials for the production of the compounds of this invention may be prepared by the processes more particularly described in the co-pending application of Lee and Weinmayr, Serial No. 723,672, filed January 22, 1947, now U. S. Patent No. 2,501,132. The 5-aminothiophanthraquinone (having a melting point of 231°–232° C.) is preferably prepared from either the 3- or 6-amino-ortho-(2-thenoyl)-benzoic acids (or mixtures of the same) by effecting ring closure in 10 parts of 96% to 100% sulfuric acid at temperatures of from 125° to 140° C. The 7-aminothiophanthraquinone, having a melting point of 274°–275° C., is prepared in a similar manner from either the 4- or 5-amino-ortho-(2-thenoyl)-benzoic acids, or mixtures of the same.

The 6-aminothiophanthraquinone (having a melting point of 271° C.) is preferably prepared by the ring closure of either the 4- or 5-nitro-ortho-(2-thenoyl)-benzoic acids (or mixtures of the same) with substantially 100% sulfuric acid at temperatures of from 70° to 160° C., with subsequent reduction of the nitro group. The ring closure may, if desired, be carried out in from one to ten minutes by maintaining the temperature at 120° to 160° C. where from 97% to 100% sulfuric acid is employed. The nitro group may be reduced to the amine with sodium hydrosulfite in sodium hydroxide solution. The 8-aminothiophanthraquinone (having a melting point of 235°–236° C.) may be prepared in the same manner from the 3-nitro- or the 6-nitro-ortho-(2-thenoyl)-benzoic acids, or mixtures of the same. The nitro-substituted thiophanthraquinones are more particularly disclosed and claimed in an application of Lee and Weinmayr, Serial No. 723,671, filed January 22, 1947, now U. S. Patent No. 2,501,131.

The nitro-ortho-(2-thenoyl)-benzoic acids used in the preparation of the above aminothiophanthraquinones may be prepared in good yields and purity by the processes more particularly described in the Lee and Weinmayr application Serial No. 723,670, filed January 22, 1947, now U. S. Patent No. 2,513,573. The nitro-substituted phthalic anhydride may be reacted with the Grignard reagent prepared from 2-bromothiophene or 2-iodothiophene, or they may be prepared by condensing the nitrophthalic anhydride with thiophene by the usual Friedel-Crafts synthesis with the aid of aluminum chloride or similar condensing agent. The 4-nitro-2-(2-thenoyl)-benzoic acid is readily obtained in good yield by reacting thiophene with 2-carbomethoxy-5-nitrobenzoyl chloride in nitrobenzene in the presence of aluminum chloride, followed by hydrolysis of the ester to the nitrothenoyl benzoic acids. The 2-carbomethoxy-3-(and 5)-nitrobenzoic acids are preferably produced from the corresponding nitrophthalic anhydrides by carrying out the esterification in an inert organic diluent which has a boiling point above 170° C., but which exhibits negligible solvent action on the monomethyl ester such as nitrobenzene or the chlorobenzenes, at 20° to 40° C., using from 1 to 1.1 mol proportions of methanol. Certain of these nitrothenoyl benzoic acid methyl esters are disclosed and claimed in co-pending application of Gladding, Serial No. 71,203, filed January 15, 1949, now U. S. Patent No. 2,519,040. Where the amino-ortho-(2-thenoyl)-benzoic acid is desired, the corresponding nitro compound may be reduced to the amine either in caustic solutions with zinc or iron or by means of hydrogen in the presence of a nickel catalyst.

The halogen aminothiophanthraquinones employed may be prepared by reacting aminothiophanthraquinones with chloride or bromine and, where necessary, eliminating part of the halogen in the polyhalogenaminothiophanthraquinones, as more particularly described in our co-pending and now abandoned application Serial No. 99,879.

The aminobenzoylaminothiophanthraquinones or the aminothenoylaminothiophanthraquinones which may be employed in the production of the compounds of this invention may be produced from the aminohalogen compounds by first benzoylating or thenoylating by the usual methods, then condensing with paratoluene sulfonamide and hydrolyzing the toluene sulfonamide group to give the free amine.

We claim:

1. The compounds of the general formula:

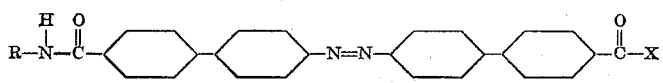

in which R stands for a thiophanthraquinone radical of the group consisting of the unsubstituted thiophanthraquinone radical and the thiophanthraquinone radicals carrying monovalent substituents of the group consisting of bromine, chlorine, methoxy, benzoylamino and thenoylamino groups, which thiophanthraquinone radical is attached to the imino group through its benzene nucleus, and X stands for a member of the group consisting of —OH, $OH_2$, —Cl and —O-alkyl in which the alkyl radical contains from 1 to 18 carbon atoms.

2. The compounds of the formula:

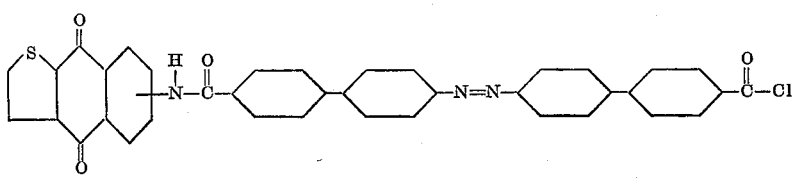

in which the thiophanthraquinone radical is attached to the imino group in an alpha position on its benzene ring.

3. The compounds of the formula:

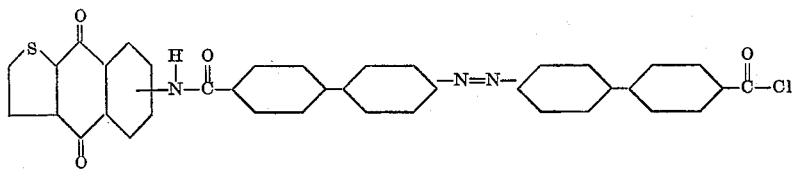

in which the thiophanthraquinone radical is attached to the imino group in a beta position on its benzene ring.

4. The compounds of the formula:

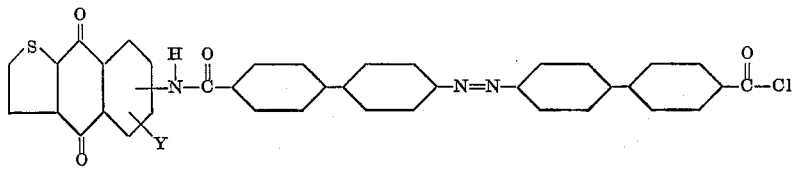

in which the thiophanthraquinone radical is attached to the imino group through its benzene nucleus and Y stands for halogen of the group consisting of bromide and chlorine attached on the benzene ring in a position ortho to the imino group.

5. The compound of the formula:

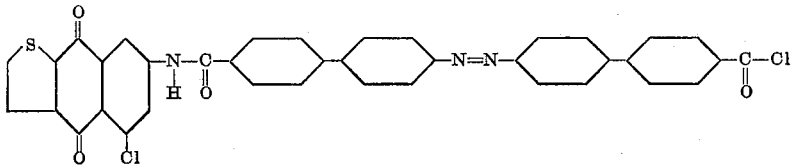

6. The compound of the formula:

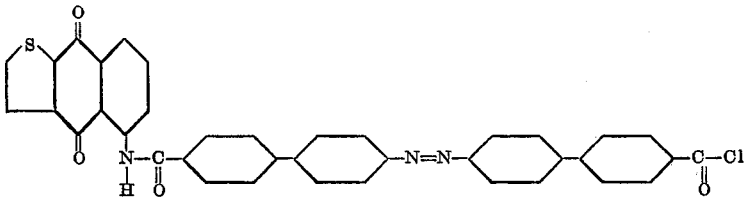

7. The compound of the formula:

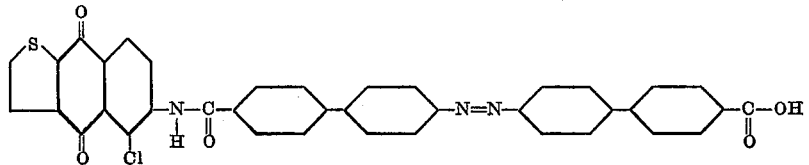

HERMAN E. SCHROEDER.
LORRAINE A. RINGROSE.

No references cited.

Certificate of Correction

Patent No. 2,559,670             July 10, 1951

HERMAN E. SCHROEDER ET AL.

It is hereby certified that error appears in the printed specification of the above numbered patent requiring correction as follows:

Column 3, Example 2, for that portion of the formula reading

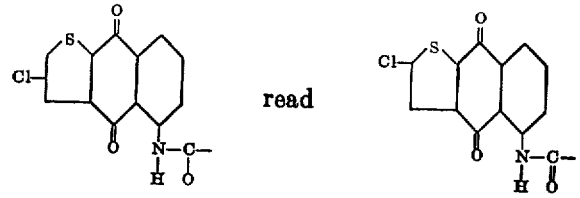

column 5, line 34, for "cottom" read *cotton*; lines 48 and 49, for "follownig" read *following*; column 8, line 73, for "OH$_2$" read —$NH_2$; column 10, line 4, for "bromide" read *bromine*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*